United States Patent

Newman et al.

[11] Patent Number: 5,947,059
[45] Date of Patent: Sep. 7, 1999

[54] HIGH EFFICIENCY GAS-FIRED CHICK BROODER

[75] Inventors: James F. Newman; F. Joseph Lockinger, both of Harrisonburg, Va.

[73] Assignee: Shenandoah Manufacturing Co., Inc., Harrisonburg, Va.

[21] Appl. No.: 09/049,925

[22] Filed: Mar. 30, 1998

[51] Int. Cl.[6] .................................................. A01K 31/20
[52] U.S. Cl. ............................................................ 119/304
[58] Field of Search .................................. 119/304, 305, 119/306, 307; 237/3, 14

[56] References Cited

U.S. PATENT DOCUMENTS

| | | | |
|---|---|---|---|
| 1,183,577 | 5/1916 | Maurer | 119/304 |
| 1,929,088 | 10/1933 | Wood | 119/304 |
| 3,429,306 | 2/1969 | Thompson . | |
| 3,505,976 | 4/1970 | Miller | 119/304 |
| 3,691,996 | 9/1972 | Bowell . | |
| 4,458,663 | 7/1984 | Kanesaka . | |
| 4,614,166 | 9/1986 | Maurice | 119/304 |
| 5,239,979 | 8/1993 | Maurice et al. | 119/304 |

*Primary Examiner*—Thomas Price
*Attorney, Agent, or Firm*—Nixon & Vanderhye P.C.

[57] ABSTRACT

Disclosed is a gas-fired chick brooder having an improved radiant which prevents reflector pan warpage and increases the efficiency of the brooder. The radiant comprising conventional fibrous ceramic is provided with a radial extension intermediate its lower and upper portions. The radial extension extends the radiant at least towards and in a preferred embodiment in contact with the perforated glow housing. This reduces or, in the preferred embodiment, prevents the flow of combustion gases into the region of the connection between the perforated glow housing and the reflector pan thereby preventing warpage of the reflector pan and improving the efficiency of operation.

16 Claims, 3 Drawing Sheets

HIGH EFFICIENCY GAS-FIRED CHICK BROODER

BACKGROUND OF THE INVENTION

1. Field of the Invention

The present invention relates generally to gas-fired chick brooders and, specifically, to improvements in gas-fired chick brooders which increases the efficiency of operation and the operational life of the brooder.

2. Brief Discussion of the Prior Art

Gas-fired chick brooders are well known embodiment and various embodiments have been patented over the years: See U.S. Pat. No. 3,429,306 issued to Thompson on Feb. 25, 1969; U.S. Pat. No. 3,505,976 issued to Miller on Apr. 14, 1970; U.S. Pat. No. 4,458,663 issued to Kanesaka on Jul. 10, 1984; and U.S. Pat. No. 4,614,166 issued to Maurice on Sep. 30, 1986. All of these brooders have in common a burner device which permits the mixing of air and gas, a combustion zone in the vicinity of a ceramic radiant which is heated thereby and, in turn, radiates heat thereby warming the surface below the brooder.

One particularly well known and commercially successful gas-fired chick brooder is manufactured by Shenandoah Manufacturing and is identified as a brooder heater Model SGB. A characteristic of this unit is that when supplied with an hourly flow of gas having approximately 45,000 BTU's, it provides appropriate heating to the floor located thereunder. This popular gas brooder is shown in FIG. 1 and indicated by arrow 10.

This prior art gas brooder comprises three main assemblies: the glow housing 12 comprising a burner mounting ring 14, a perforated glow housing 16, and a reflector pan 18; the radiant 20; and the burner 22. Gas, either liquid, natural gas (LNG) or propane, is supplied to the burner 22 by pipe 24. The gas/air mixture coming from burner 22 is shown by arrows 26 traveling through combustion volume 28 formed in the space between radiant 20 and the perforated glow housing 16.

As can be seen in FIG. 1, the perforations permit inflow of external air to the combustion volume for mixing with the gas and outflow of hot combustion by-products. While a substantial portion of this combustion byproducts flow passes through the perforations to the outside air thereby heating the perforated glow housing 16 to a radiant condition, a substantial amount of the gases travel upwards and are trapped in the vicinity of the junction between the perforated glow housing 16 and the reflector pan 18. Because hot gases rise, extremely high temperature concentrations are achieved at this junction.

While the radiant 20 made of pressed ceramic fiber is unaffected by this high temperature, the instability and non-uniformity in gas flow around the upper portion of the combustion volume 28 causes localized hot spots. This irregularity in heating of the metal junction between reflector pan 18 and perforated glow housing 16 results in warping of the metal such that the seal between upper lip 30 of the radiant and the reflector pan 18 is broken leaving a gap such as that shown in FIG. 2a.

Once such a gap has been created, the hot combustion gases 26 in combustion volume 28 will take the path of least resistance in traveling upwards and will tend to travel up through this opening. As a result, this portion of the reflector pan becomes even hotter, and as a result, warps even more. The ultimate result is a substantially warped reflector pan, a non-uniform gas flow rate around the perforated glow housing 16 and a non-uniform temperature distribution on the floor below the brooder.

Accordingly, in order to insure that minimal required temperatures are maintained under the brooder, a greater amount of BTU's in the form of input gas supply is necessary rendering the brooder somewhat less than optimum in terms of operating efficiency.

SUMMARY OF THE INVENTION

Accordingly, in view of the above, it is an object of the present invention to reduce the flow of hot gases into the junction region between the perforated glow housing and the support lip of the radiant.

It is a still further object of the present invention to reduce the temperature levels at the boundary between the perforated glow housing and the reflector pan and maintain a uniform gas distribution around the perforated glow housing.

The above and other objects are accomplished by providing a radial extension of the radiant intermediate the lower portion of the radiant and the upper lip of the radiant. This radial extension extends into the combustion volume and in a preferred embodiment contacts the perforated glow housing at a point below the junction between the perforated flow housing and the reflector pan. This radial extension serves to reduce, or in a preferred embodiment block, hot gases from passing into the vicinity of the junction of the perforated glow housing and reflector pan and thereby prevents the elevated temperatures and the warping consequence of such elevated temperatures.

Furthermore, with the radial extension located near the junction between the perforated glow housing and the reflector pan, it insures that most, if not all, of the combustion products pass through the perforations in the perforated glow housing thereby uniformly heating this housing and providing a more uniform temperature distribution on any surface below the brooder.

BRIEF DESCRIPTION OF THE DRAWINGS

The invention will now be described by way of example only with reference to the accompanying drawings of which.

DETAILED DISCUSSION OF PREFERRED EMBODIMENTS

Figure 2A:
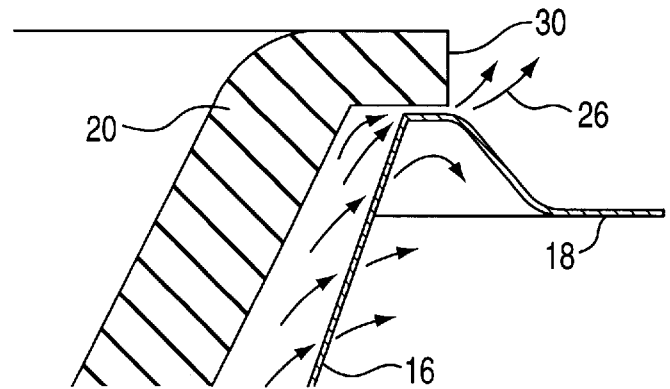
FIG. 2a is a cross sectional view of a portion of the prior art chick brooder shown in FIG. 1.
Figure 2B:
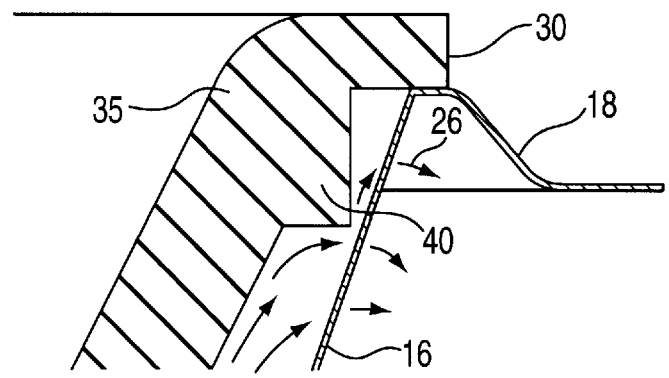
FIG. 2b is a side cross sectional view of a portion of a chick brooder in accordance with the present invention.

Like elements are described with the same numbers in the several views. Applicants have found when faced with the problem of warpage of the reflector pan and non-uniform heating that the inclusion of a radial extension or protrusion 40 shown in FIGS. 2b and 2c will reduce the flow of combustion gases into the region of the junction between reflector pan 18 and perforated glow housing 16 as shown in FIG. 2b.

Figure 2C:
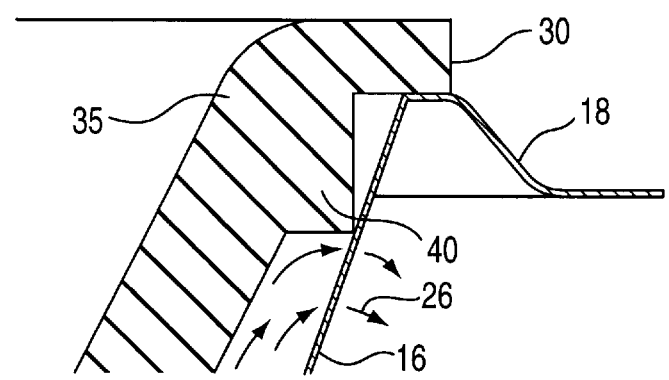
FIG. 2c is a side cross sectional view of a further embodiment of a chick brooder in accordance with the present invention.

In a preferred embodiment, the protrusion 40 extends into contact with the perforated glow housing 16 as shown in FIG. 2c which insures that most, if not all, combustion gases pass through the perforations in the perforated glow housing 16 and do not travel into the space adjacent the junction between the perforated glow housing 16 and reflector pan 18. In each of the embodiments shown in FIGS. 2b and 2c, the combustion gas flow is partially or completely diverted by improved radiant 35 from the junction between the perforated glow housing 16 and reflector pan 18 thereby avoiding hot spots and localized warping of the reflector pan. This, in turn, prevents gaps from forming between the reflector pan and the lip 30 of radiant 35 which serves to exacerbate the problem.

A side benefit of the use of radial extensions 40 is that less gas input is necessary in order to maintain the same temperature conditions below the brooder. For example, in the prior art Shenandoah Manufacturing Company brooder heater Model SGB, a gas flow having a BTU heat output of 45,000 BTU's per hour was necessary in order to maintain a 70° floor temperature below the brooder. With the radial extensions shown in FIGS. 2b or 2c, a gas flow rate of only 40,000 BTU's per hour was necessary in order to maintain the same floor temperature level. Thus, there appears to be a 10% increase in efficiency as well as a substantial increase in the life of the brooder due to avoidance of warping effects on the reflector pan.

Figure 3:
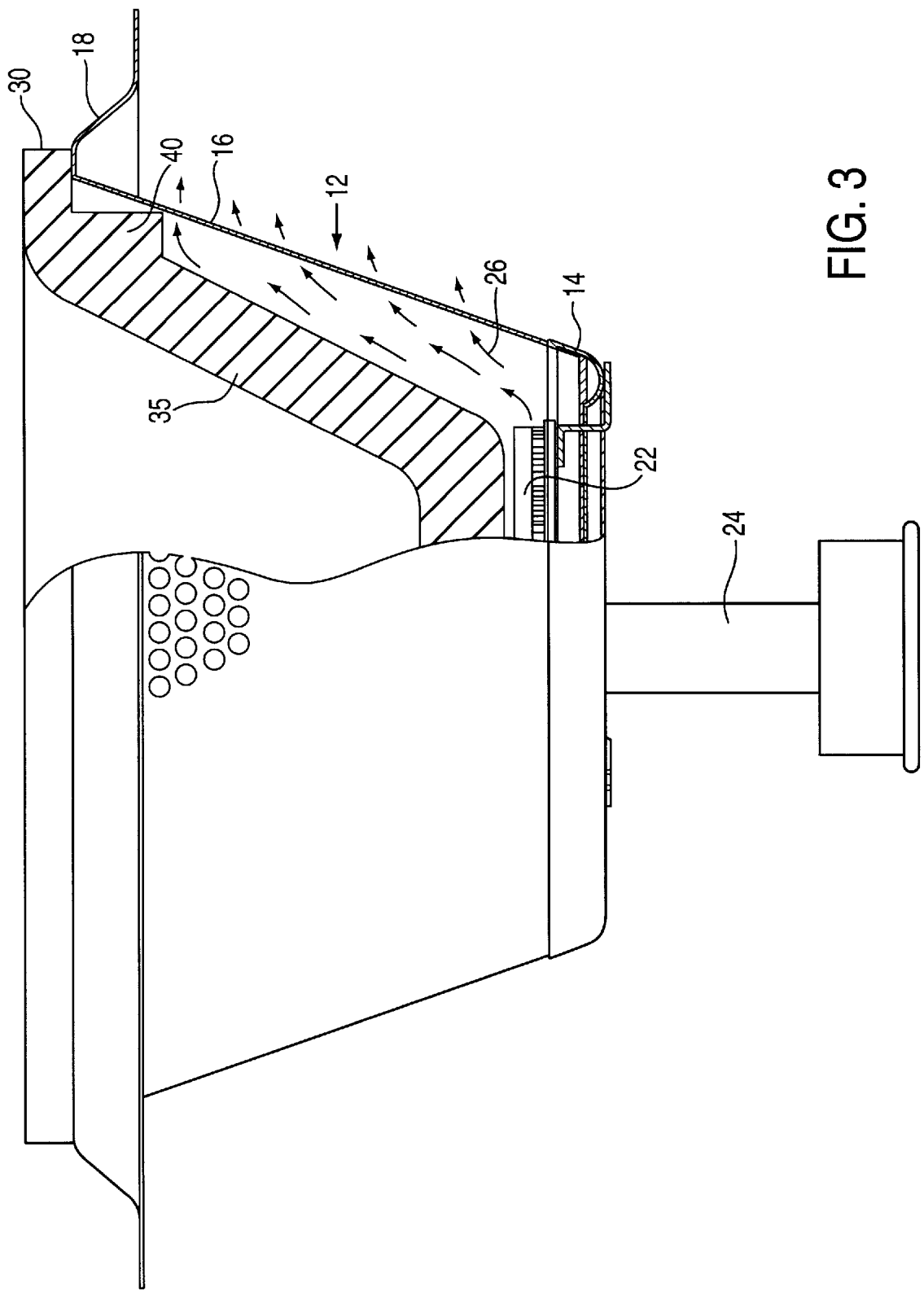
FIG. 3 is a side view partially in section of a chick brooder in accordance with the present invention.

FIG. 3 illustrates the full installation of the present invention. The improved radiant 35 has been substituted for the conventional radiant 20 shown in FIG. 1. With this one substitution, the problems of warping of the junction between the reflector pan 18 and the perforated glow housing 16 are overcome and a more efficient brooder is the result.

Figure 1:
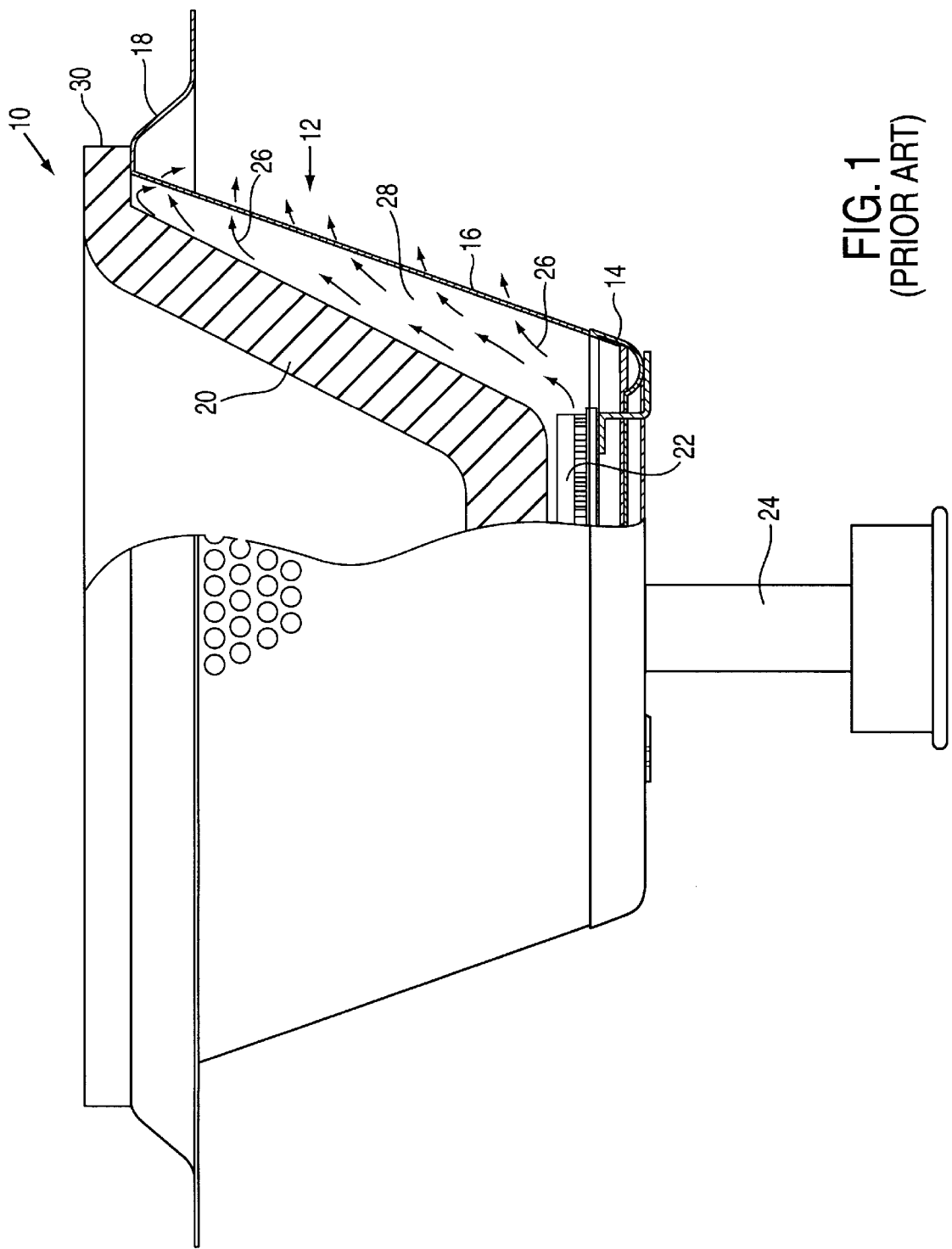
FIG. 1 is a side view partially in section of the prior art gas-fired chick brooder.

The improved radiant 35 is comprised of the same materials as the previous radiant and is available both from Specialty Ceramics Inc., 41995 State Rt. 344, Columbiana, Ohio 44408 or Thermal Ceramics Inc., P. O. Box 920047, Atlanta, Ga. 30392, as is well known. Also conventional is the construction materials of the glow housing comprising the burner mounting ring 14, perforated glow housing 16 and reflector pan 18 and, in a preferred embodiment, all are comprised of stainless steel which is either spot welded together or assembled by means of interfitting tabs and slots. The burner assembly and means for controlling the gas supply are well known. The only significant structural difference between FIG. 3 and FIG. 1 is the improved radiant 35 with the radial extension 40 and the resultant increase in operational life (due to curing the warping problem) and increased operating efficiency).

It will be readily apparent to those having ordinary skill in the art that there are many modifications of the present invention. For example, the sides of the radial extension of radiant 35 in FIGS. 2b, 2c and 3 are shown as being cylindrical. Quite clearly, any extension which extends towards the perforated glow housing and serves to restrict or eliminate the flow of combustion gases to the junction of the reflector pan and perforated glow housing will accomplish the result of the present invention. Accordingly, any variety of shapes will be readily apparent to those having ordinary skill in the art.

Additionally, in some embodiments, it may be desirable to at least partially support the fiber radiant by means of contact between the radial extensions 40 and the perforated glow housing 16 thereby reducing or eliminating the need for upper lip 30. An inner rib on the perforated glow housing extending towards the radiant would also serve the purpose of reducing or eliminating the flow of combustion by-products into the junction between the perforated glow housing and the reflector pan. Many different configurations of the radiant 35 and/or the perforated glow housing 16 are available so as to, in combination, restrict the flow of combustion gases into the region of the connection between the perforated glow housing and the reflector pan.

Accordingly, the present invention is limited only by the claims appended hereto.

What is claimed is:

1. A high efficiency gas fired chick brooder comprising:
   a glow housing, said glow housing including a perforated glow housing and a reflector plate mounted thereon;
   a radiant comprised of a high temperature insulation material; and
   a gas burner assembly, where said radiant is disposed within and laterally spaced from said perforated housing to define a combustion volume, said radiant having an upper horizontally extended lip which during operation is generally in contact with an upper surface of said reflector plate, said radiant having a lower portion spaced apart from said burner assembly, said radiant including a radial extension located intermediate said upper lip and said lower portion, said radial extension extending towards said perforated glow housing, thereby at least restricting the flow of combustion gases from said burner to an upper portion of said glow housing.

2. A high efficiency gas fired chick brooder according to claim 1, wherein said radial extension does not contact said perforated housing.

3. A high efficiency gas fired chick brooder according to claim 1, wherein said radial extension contacts said perforated housing.

4. A high efficiency gas fired chick brooder according to claim 1, wherein said radiant comprises a fibrous ceramic material.

5. A high efficiency gas fired chick brooder according to claim 1, wherein said radial extension has a planar lower surface and a cylindrical side surface.

6. A high efficiency gas fired chick brooder comprising:
   a glow housing, said glow housing including a perforated glow housing and a reflector plate mounted thereon;
   a radiant comprised of a high temperature insulation material; and
   a gas burner assembly, where said radiant is disposed within and laterally spaced from said perforated housing to define a combustion volume, said radiant having an upper horizontally extended lip which during operation is generally in contact with an upper surface of said reflector plate, said radiant having a lower portion spaced apart from said burner assembly, said radiant including a radial extension, located intermediate said upper lip and said lower portion, comprising a means for restricting the flow of combustion gases from said burner to an upper portion of said glow housing.

7. A high efficiency gas fired chick brooder according to claim 6, wherein said radial extension does not contact said perforated housing.

8. A high efficiency gas fired chick brooder according to claim 6, wherein said radial extension contacts said perforated housing.

9. A high efficiency gas fired chick brooder according to claim 6, wherein said radiant comprises a fibrous ceramic material.

10. A high efficiency gas fired chick brooder according to claim 6, wherein said radial extension has a planar lower surface and a cylindrical side surface.

11. A high efficiency gas fired chick brooder comprising:
a glow housing, said glow housing including a perforated glow housing and a reflector plate mounted thereon;
a radiant comprised of a high temperature insulation material; and
a gas burner assembly, where said radiant is disposed within and laterally spaced from said perforated housing to define a combustion volume, said radiant having an upper horizontally extended lip which during operation is generally in contact with an upper surface of said reflector plate, said radiant having a lower portion spaced apart from said burner assembly, said radiant and said perforated glow housing comprising a means, located intermediate said upper lip and said lower portion, for restricting the flow of combustion gases from said burner to an upper portion of said glow housing.

12. A high efficiency gas fired chick brooder according to claim 11, wherein said radial extension does not contact said perforated housing.

13. A high efficiency gas fired chick brooder according to claim 11, wherein said radial extension contacts said perforated housing.

14. A high efficiency gas fired chick brooder according to claim 11, wherein said radiant comprises a fibrous ceramic material.

15. A high efficiency gas fired chick brooder according to claim 11, wherein said radial extension has a planar lower surface and a cylindrical side surface.

16. In a gas fired chick brooder having a glow housing, a radiant and a burner assembly, where said glow housing includes a perforated glow housing and a reflector plate mounted thereon, and where said radiant is disposed within and laterally spaced from said perforated housing to define a combustion volume, said radiant having an upper horizontally extended lip which during operation is generally in contact with an upper surface of said reflector plate, said radiant having a lower portion spaced apart from said burner assembly, an improvement comprising a radial extension of said radiant located intermediate said upper lip and said lower portion, said radial extension extending towards said perforated glow housing.

* * * * *